(12) United States Patent
Itai

(10) Patent No.: US 7,058,069 B2
(45) Date of Patent: Jun. 6, 2006

(54) DELAY VARIATION BUFFER CONTROL TECHNIQUE

(75) Inventor: Taihei Itai, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 855 days.

(21) Appl. No.: 09/797,590

(22) Filed: Mar. 5, 2001

(65) Prior Publication Data

US 2001/0019537 A1     Sep. 6, 2001

(30) Foreign Application Priority Data

Mar. 3, 2000 (JP) .............................. 2000-058242

(51) Int. Cl.
*H04L 12/28* (2006.01)

(52) U.S. Cl. ..................................... 370/412; 370/517

(58) Field of Classification Search .......... 370/395.51, 370/395.71, 465, 466, 516, 517, 412

See application file for complete search history.

(56) References Cited

U.S. PATENT DOCUMENTS

| | | | | |
|---|---|---|---|---|
| 5,007,070 A | * | 4/1991 | Chao et al. ................. | 375/371 |
| 5,629,927 A | * | 5/1997 | Waclawsky et al. ........ | 370/253 |
| 5,896,384 A | * | 4/1999 | Erickson ...................... | 370/452 |
| 5,966,387 A | * | 10/1999 | Cloutier ....................... | 370/516 |
| 6,400,683 B1 | * | 6/2002 | Jay et al. ..................... | 370/229 |
| 6,424,651 B1 | * | 7/2002 | Chan et al. ............... | 370/395.6 |
| 6,480,491 B1 | * | 11/2002 | Miao ........................... | 370/394 |

FOREIGN PATENT DOCUMENTS

| | | |
|---|---|---|
| JP | 4-331529 | 11/1992 |
| JP | 8-32590 | 2/1996 |
| JP | 9-102772 | 4/1997 |
| JP | 9-191321 | 7/1997 |

* cited by examiner

*Primary Examiner*—Ricky Q. Ngo
*Assistant Examiner*—Christine Ng
(74) *Attorney, Agent, or Firm*—Harrity Snyder, L.L.P.

(57) ABSTRACT

A delay variation buffer controller allowing proper cell delay variation control reflecting an actual network operation status is disclosed. A detector detects an empty status of the data buffer when data is read out from the data buffer at intervals of a controllable time period. A counter counts the number of contiguous times the empty status was detected. A proper time period is calculated depending on a value of the counter at a time when the empty status is not detected and the value of the counter is not zero. A timing corrector corrects the controllable time period to match the proper time delay and setting the controllable time delay to a predetermined value when the empty status is not detected and the value of the counter is zero.

18 Claims, 6 Drawing Sheets

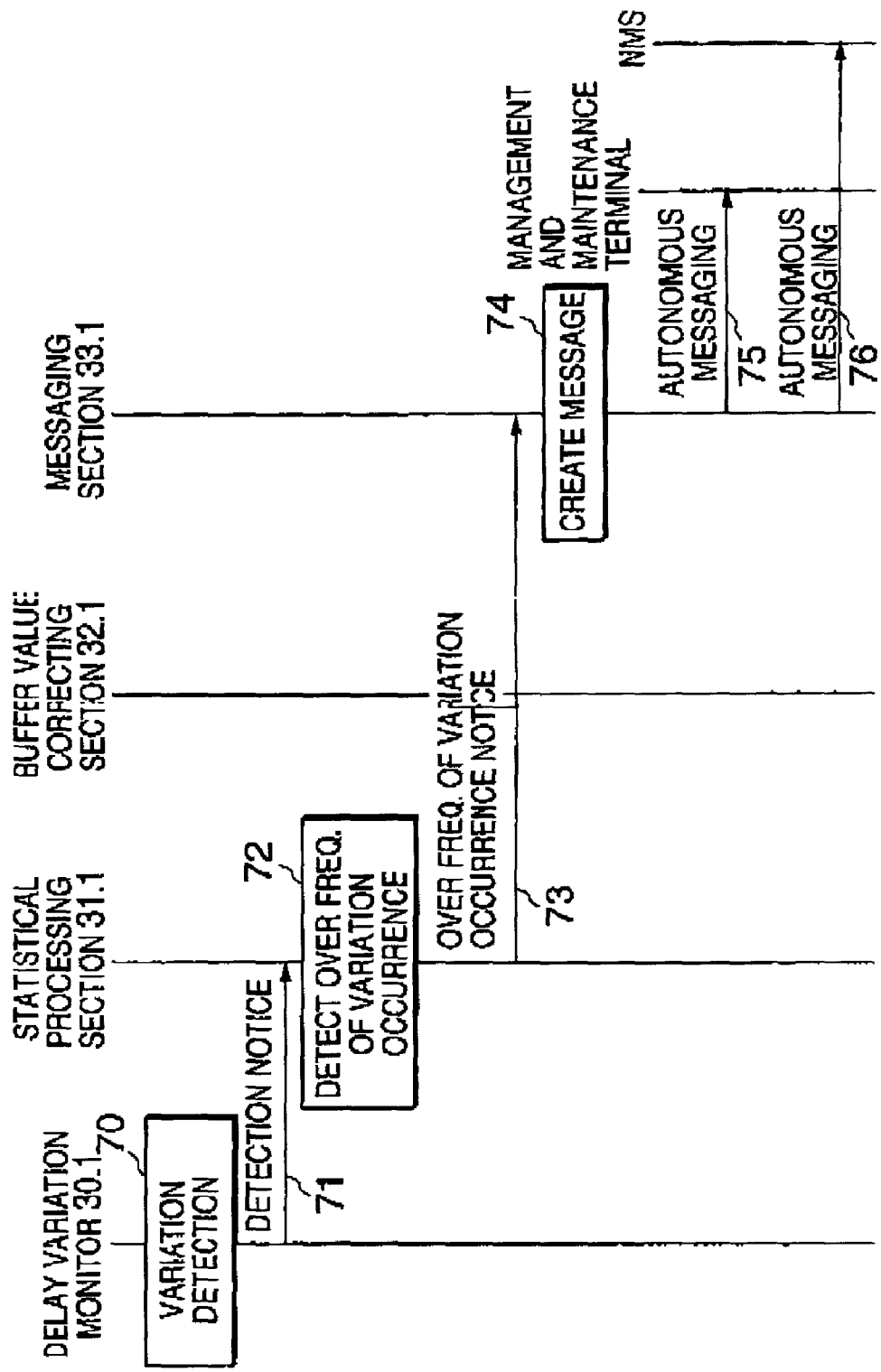

DELAY VARIATION BUFFER CONTROL TECHNIQUE

BACKGROUND OF THE INVENTION

1. Field of the Invention

The present invention relates to a controller for a delay variation buffer, and in particular to a controller and control method suitable for a delay-variation buffer absorbing delay variation of cells received from ATM (asynchronous transfer mode) network and transferred to STM (synchronous transfer mode) network.

2. Description of the Related Art

In a network composed of an ATM network connecting two STM networks that both uses existing network equipment to transfer data in a period of constant frame, a circuit emulation service is needed at an interface between ATM and STM networks to perform bi-directional conversion between ATM cell and STM frame. A circuit emulator providing the circuit emulation service (hereafter, abbreviated as CE) is implemented by emulating STM on ATM line.

Since ATM cells may be transferred through different paths across an ATM network, variations in delay or jitter occur to cells that were nominally spaced prior to transfer across the ATM network. In order to generate STM frames from asynchronously arriving cells and stably and reliably transmit them to the STM network, the CE is provided with a buffer for buffering ATM cells arriving with variations in delay and a delay-variation absorbing controller.

There have been proposed several delay-variation buffer controllers aiming at absorbing the variations in delay to avoid a substantial reduction in the quality of service.

For example, Japanese Patent Application Unexamined Publication No. 4-331529 discloses a delay-variation buffer controller that controls a delay-variation absorbable width based on a calculated cell loss ratio.

However, such a delay-variation buffer controller can be applied to only the case where ATM cells permitted to be discarded are converted into STM frames. In other words, a delay-variation control cannot be successfully performed unless ATM cells are permitted to be discarded. Since ATM communication is characterized in that a network can be constructed independently of type of service, it is preferable that the delay-variation buffer control is applied to not only ATM cells that are permitted to be discarded but also ATM cells that are not permitted to be discarded.

As another prior art, Japanese Patent Application Unexamined Publication No. 9-102772 discloses an ATM/STM converter in which readout of cells from a delay-variation absorbing buffer is controlled based on detected cell delay variation on ATM line. Such a buffer control can avoid increasing data delay caused by the capacity of the buffer increasing more than necessary in communication environment with wide variation in delay.

However, this prior art needs to measure the amount of cell variation by sending test cells before actual data transmission. Therefore, the detected cell delay variation does not reflect an actual network operation status, which cannot achieve proper cell delay variation control.

SUMMARY OF THE INVENTION

An object of the present invention is to provide a delay variation buffer controller allowing proper cell delay variation control reflecting an actual network operation status.

According to the present invention, a controller for controlling a data butter, includes: a detector for detecting an empty status of the data buffer when data is read out from the data buffer at intervals of a controllable time period; a counter for counting number of contiguous times the empty status was detected; and a buffer controller for changing the controllable time period depending on a value of the counter at a time when the empty status is not detected.

According to an aspect of the present invention, a controller includes: a detector for detecting an empty status of the data buffer when data is read out from the data buffer at intervals of a controllable time period; a counter for counting number of contiguous times the empty status was detected; a calculator for calculating a proper time period depending on a value of the counter at a time when the empty status is not detected and the value of the counter is not zero; and a timing corrector for correcting the controllable time period to match the proper time period and setting the controllable time period to a predetermined value when the empty status is not detected and the value of the counter is zero.

The calculator may calculate the proper timing period such that the proper time period increases linearly with an increase of the value of the counter. The calculator may calculate the proper time period X by an expression as follows:

$$X = Y \times Z + B,$$

where Y is a value of the counter, Z is a current controllable timing period, and B is a minimum value of controllable time period.

The timing corrector may set the controllable time period to the predetermined value when the empty status is not detected and the value of the counter is zero, wherein the predetermined value is an initial value which is a minimum value of the controllable time period.

The controller may further include: a determiner for determining whether a value of the counter exceeds a predetermined threshold; and a message creator for creating a message when the value of the counter exceeds the predetermined threshold, the message indicating that the number of contiguous times the empty status was detected exceeds the predetermined threshold.

The counter may be reset after correcting the controllable time period to match the proper time period or creating the message.

According to another aspect of the present invention, a control method for controlling a data buffer, includes the steps of: a) detecting an empty status of the data buffer when data is read out from the data buffer at intervals of a controllable time period; b) counting number of contiguous times the empty status was detected to produce a count value; c) calculating a proper time period depending on a count value at a time when the empty status is not detected and the count value is not zero; d) correcting the controllable time period to match the proper time period; and e) setting the controllable time period to a predetermined value when the empty status is not detected and the count value is zero.

According to still another aspect of the present invention, a device for use in an ATM (asynchronous transfer mode) node connecting an ATM network and a STM (synchronous transfer mode) network, includes: a cell disassembler for converting a sequence of ATM cells into a sequence of STM frames; a buffer for storing an ATM cell received from the ATM network and sending it to the cell disassembler with a controllable time delay to absorb cell delay variation; a detector for detecting an empty status of the buffer when a ATM cell is read out from the buffer at intervals of the controllable time delay; a counter for counting number of contiguous times the empty status was detected; and a buffer controller for changing the controllable time delay depending on a value of the counter at a time when the empty status is not detected.

As described above, according to the present invention, a variation buffer value can be rapidly corrected to a proper value without any test prior to actual data communication. Therefore, efficient data communication can be achieved reflecting the actual network operation status.

In the case where no cell delay variation is detected, the variation buffer value is initialized to the basic value and thereby ATM cells stored in the buffer are read out at intervals of a shorter time period. Since undesired delay of transfer of ATM cells stored in the buffer can be avoided, the variation buffer control is suitable for data communications requiring real-time operation.

Further, since the network management side can know on the correction of variation buffer value by receiving the autonomous message, the capability of management and maintenance can be improved without burden on the network management side.

Further, when the number of contiguous occurrences of cell delay variation exceeds the predetermined value, an autonomous message of over-frequency of delay variation occurrence is sent to the network management side and the buffer value is not updated. Therefore, rapid maintenance work can be achieved without burden on the network management side.

BRIEF DESCRIPTION OF THE DRAWINGS

FIG. 7 is a sequence diagram showing an operation of the controller in the case where the frequency of occurrence exceeds a predetermined value.

DESCRIPTION OF THE PREFERRED EMBODIMENT

Figure 1:
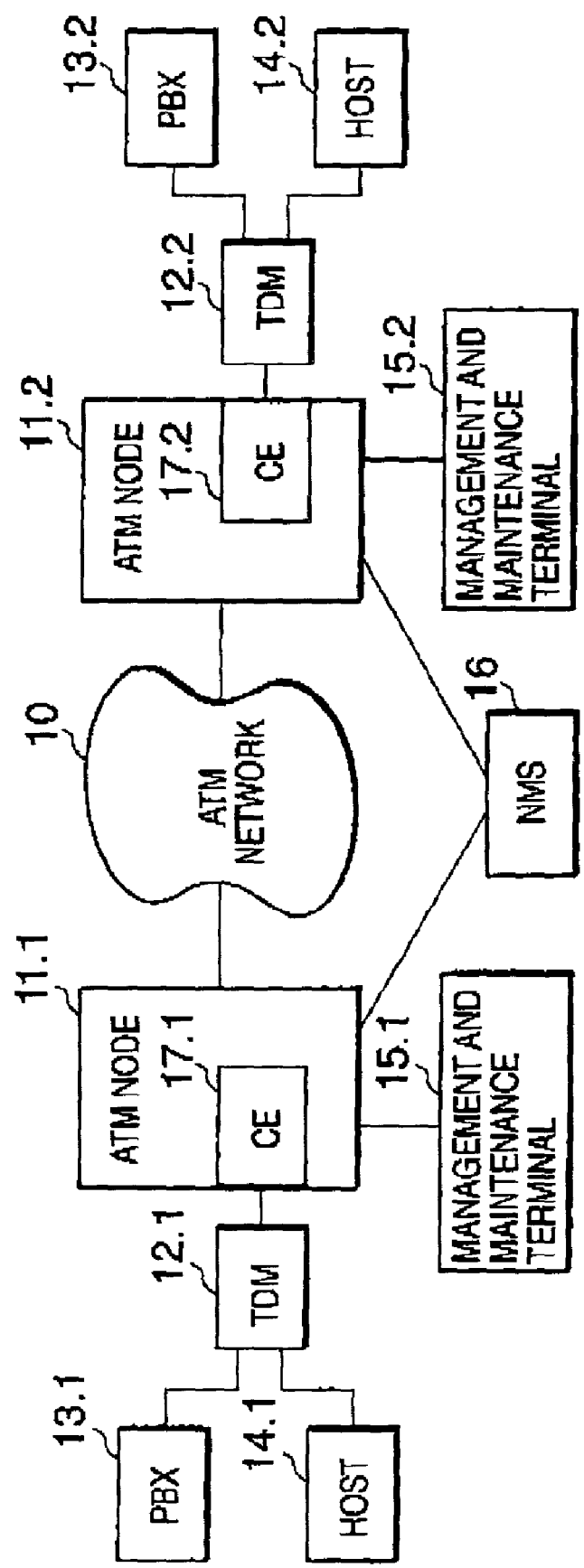
FIG. 1 is a diagram showing a network system configuration employing a delay variation buffer controller.

Referring to FIG. 1, it is assumed for simplicity that a network system is composed of STM networks connected via an ATM network 10. The network is realized by shifting an existing dedicated network using a time-division multiplexer (hereafter, abbreviated as TDM) to ATM network such that the existing TDM is accommodated under the ATM network.

More specifically, ATM nodes 11.1 and 11.2 are connected via the ATM network 10. The ATM node 11.1 is connected to an existing TDM 12.1 that is in turn connected to PBX (Private Branch eXchange) 13.1 and a host computer 14.1. Similarly, the ATM node 11.2 is connected to an existing TDM 12.2 that is in turn connected to PBX 13.2 and a host computer 14.2. The respective PBXs 13.1 and 13.2 may accommodate local networks (not shown). Synchronous communications using STM frames are performed in the host computer 14.1 and the local network accommodated in the PBX 13.1 and in the host computer 14.2 and the local network accommodated in the PBX 13.2.

In addition, the ATM node 11.1 and 11.2 are connected to management and maintenance terminals 15.1 and 15.2, respectively, and thereby various settings and cell delay variation monitoring are performed in each of the ATM nodes 11.1 and 11.2. Further, a network management system (NMS) 16 is connected to both the ATM nodes 11.1 and 11.2 to manage the network composed of ATM network 10 and ATM nodes 11.1 and 11.2.

The ATM node 11.1 has a circuit emulator (CE) 17.1 implemented therein to allow STM/ATM conversion and cell delay variation control. Similarly, the ATM node 11.2 has a circuit emulator (CE) 17.2 implemented therein to allow STM/ATM conversion and cell delay variation control. Since the circuit emulators 17.1 and 17.2 have the same circuit configuration, the circuit emulator 17.1 will be described as an example.

Circuit Emulator (CE)

Figure 2:
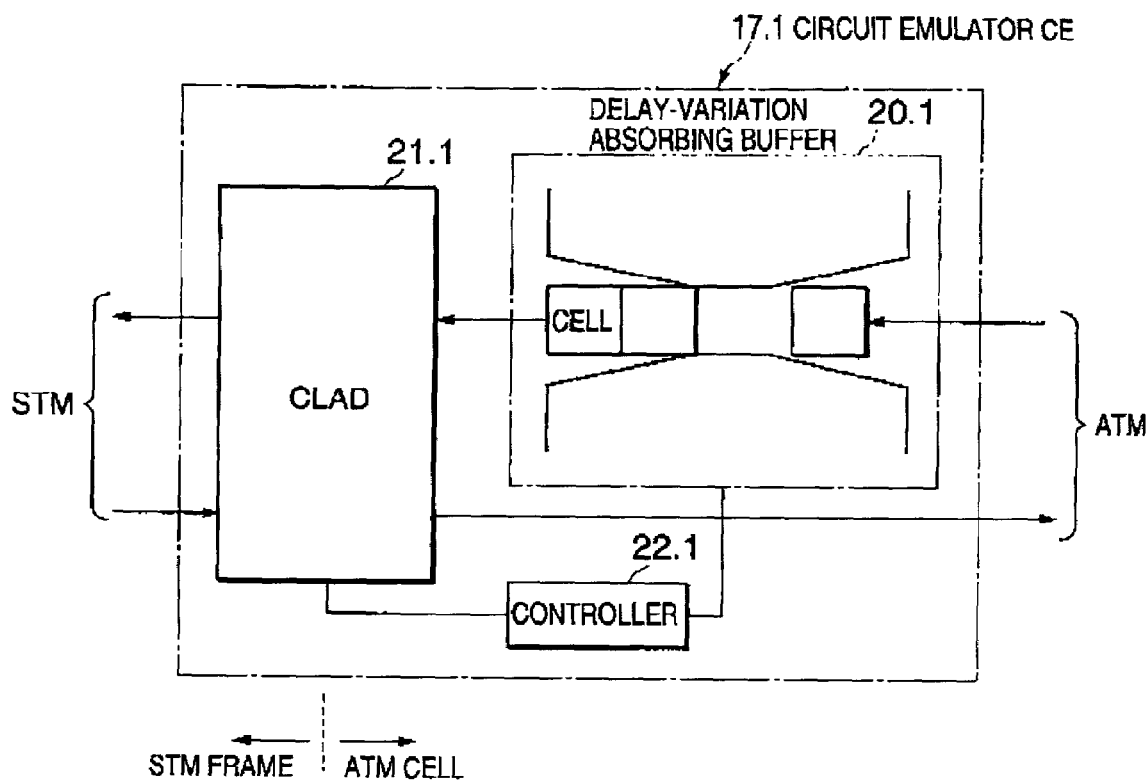
FIG. 2 is a block diagram showing a circuit emulator (CE) having a function of delay variation buffer control according to an embodiment of the present invention.

Referring to FIG. 2, the circuit emulator 17.1 includes a delay-variation absorbing buffer 20.1, a cell assembly and disassembly (CLAD) 21.1, and a controller 22.1. The delay-variation absorbing buffer 20.1 sequentially stores ATM cells that are received from the ATM network 10, to absorb cell delay variations under control of the controller 22.1. The CLAD 21.1 assembles STM frames from ATM cells and disassembles STM frames into ATM cells. The controller 22.1 controls the operations of the delay-variation absorbing buffer 20.1 and the CLAD 21.1.

More specifically, the controller 22.1 controls a delaying time period (msec) of ATM cells in the delay-variation absorbing buffer 20.1. Hereafter, such a delaying time period is called a variation buffer value. The delay-variation absorbing buffer 20.1 reads out the stored ATM cells to send them to the CLAD 21.1 in a period of the controlled variation buffer value (msec).

When receiving the ATM cells from the delay-variation absorbing buffer 20.1, the CLAD 21.1 assembles a STM frame of a preset format from the ATM cells and transmits it to the TDM 12.1. On the other hand, when receiving a STM frame from the TDM 12.1, the CLAD 21.1 disassembles the STM frame into ATM cells and transmits them directly to the ATM network 10.

The controller 22.1 monitors the presence or absence of ATM cells in the buffer 20.1 to detect the occurrence of cell delay variation. As will be described later, when no cell is stored in the buffer 20.1 after an elapse of a controlled variation buffer value, the controller 22.1 determines that cell delay variation occurs. When such a cell delay variation contiguously occurs a plurality of times, the controller 22.1 adjusts the variation buffer value for delaying the readout of ATM cells in the buffer 20.1 based on the contiguous frequency of occurrence of cell delay variation. The details of the controller 22.1 will be described with reference to FIGS. 3–5.

Delay Variation Absorbing Control

Figure 3:
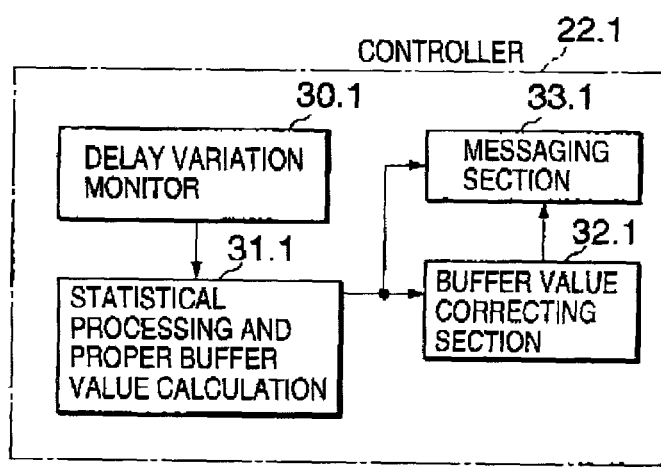
FIG. 3 is a block diagram showing the functional configuration of a controller in the circuit emulator of FIG. 2.

Referring to FIG. 3, the controller 22.1 includes a delay variation monitor 30.1, a statistical processing section 31.1, a buffer value correcting section 32.1, and a messaging section 33.1.

The delay variation monitor 30.1 checks whether the buffer 20.1 is empty when an elapse of a controlled variation buffer value. If the buffer 20.1 stores no cells at the time when the controlled variation buffer value has elapsed, then the delay variation monitor 30.1 detects the occurrence of cell delay variation. Then, the delay variation monitor 30.1 notifies the statistical processing section 31.1 of the occurrence of cell delay variation.

The statistical processing section 31.1 counts the contiguous occurrence of cell delay variation notified from the delay variation monitor 30.1 and calculates a proper variation buffer value depending on the number of contiguous times the cell delay variation has occurred. The proper variation buffer value is output to the buffer value correcting section 32.1 and the messaging section 33.1.

The buffer value correcting section 32.1 replaces a current variation buffer value with the received proper variation buffer value, which is used as an absorbing time width to delay transfer of ATM cells from the delay-variation absorbing buffer 20.1 to the CLAD 21.1. Therefore, after this, a period of readout of ATM cells is set to the new proper variation buffer value. Thereafter, a correction completion notice is sent to the messaging section 33.1.

The messaging section 33.1 autonomously creates a message based on notices received from the statistical processing section 31.1 or the buffer value correcting section 32.1 and then transmits the message to the management and maintenance terminal 15.1 and NMS 16.

The controller 22.1 as described above includes a program-controlled processor such as CPU (central processing unit) (not shown). Necessary programs including a buffer control program stored in read-only memory (ROM) or the like are allowed to run on the CPU. Therefore, the delay variation monitor 30.1, the statistical processing section 31.1, the buffer value correcting section 32.1, and the messaging section 33.1 may be implemented by running a delay variation absorbing control program on the CPU.

Figure 4:
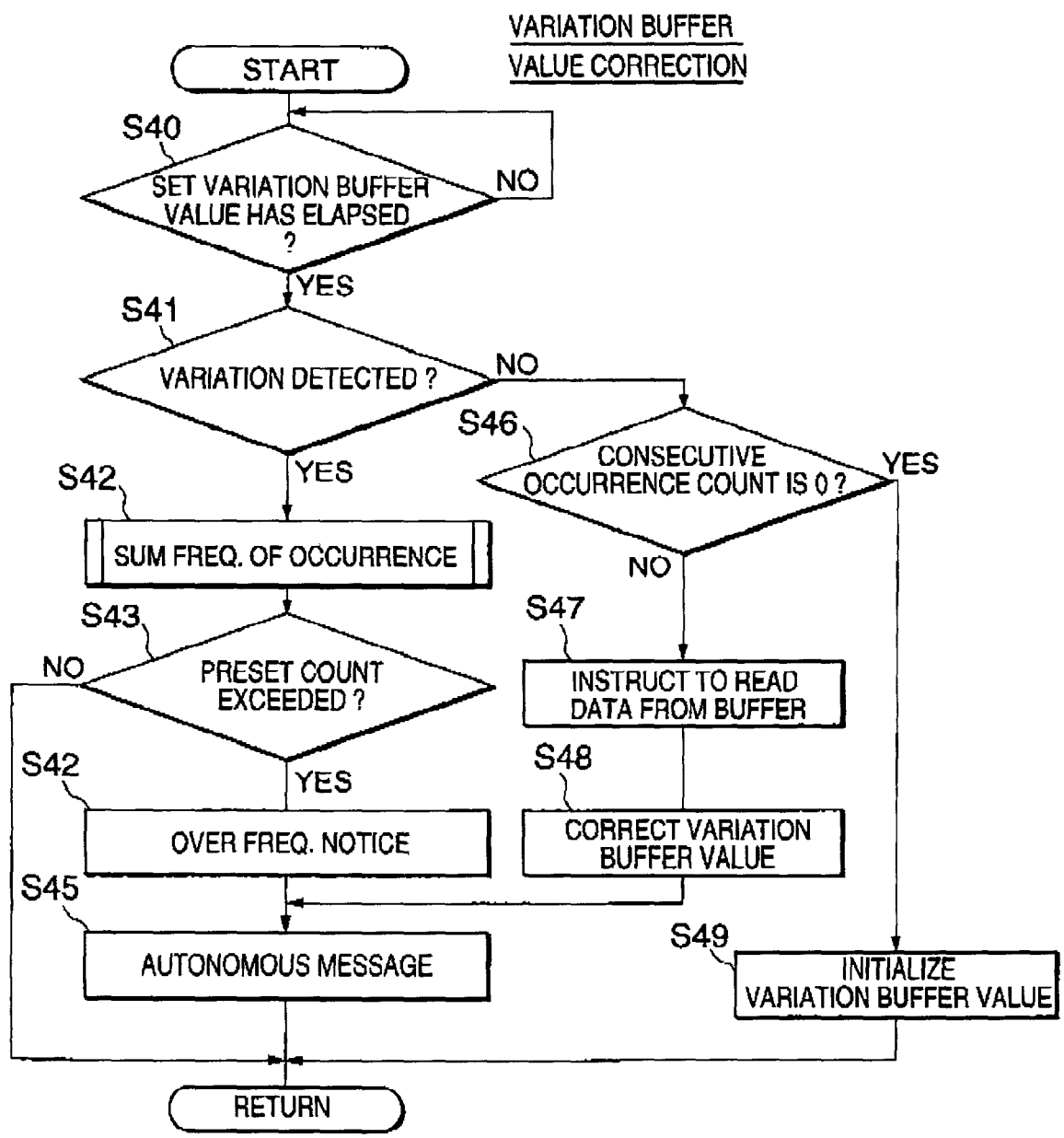
FIG. 4 is a flowchart showing an operation of correcting a variation buffer value in the embodiment.

Referring to FIG. 4, when the variation absorbing buffer control program starts, it is determined whether a current variation buffer value (msec) has elapsed (step S40). When the current variation buffer value (msec) has elapsed (YES at step S40), the delay variation monitor 30.1 is instructed to monitor the current status of the buffer 20.1 to determine whether cell delay variation occurs (step S41). If the buffer 20.1 stores no cells at that time, then the delay variation monitor 30.1 detects the occurrence of cell delay variation (YES at step S41). Then, the delay variation monitor 30.1 sends a notice of the occurrence of cell delay variation to the statistical processing section 31.1.

When receiving the notice of the occurrence of cell delay variation from the delay variation monitor 30.1 (YES at step S41), the statistical processing section 31.1 increments a counter by one to count the number of notices of the occurrence of cell delay variation and then determines whether the count exceeds a predetermined count value (step S43). When the count exceeds the predetermined count value, which means that the number of contiguous times the notice of the occurrence of cell delay variation has been received (YES at step S43), the statistical processing section 31.1 sends a notice of over-frequency of delay variation occurrence to the messaging section 33.1 (step S44) and thereby the messaging section 33.1 is instructed to autonomously send a message to the management and maintenance terminal 15.1 and NMS 16 (step S45). Thereafter, the control goes back to the step S40 (return). When the count is equal to or smaller than the predetermined count value (NO at step S43), the control also goes back to the step S40 (return).

On the other hand, when receiving no notice of the occurrence of cell delay variation (NO at step S41), the statistical processing section 31.1 determines whether the contiguous variation occurrence count is 0 (step S46). If the contiguous variation occurrence count is not 0, that is, the counter's value is 1 or more (NO at step S46), it is determined that the phenomenon of variation that has occurred stops. Therefore, the buffer 20.1 is instructed to read out the stored cells (step S47) and the buffer value correcting section 32.1 is instructed to correct the variation buffer value using a new proper variation buffer value (step S48). When the variation buffer value correction has been completed, the buffer value correcting section 32.1 notifies the messaging section 33.1 of the completion of variation buffer value correction. Thereby the messaging section 33.1 is instructed to autonomously send a message indicative of the completion of variation buffer value correction to the management and maintenance terminal 15.1 and NMS 16 (step S45). Thereafter, the control goes back to the step S40 (return).

If the contiguous variation occurrence count is 0, that is, the counter's value is zero (YES at step S46) it means that no variation occurrence is detected and any variation occurrence has been never detected so far. Therefore, the variation buffer value is set to the basic value and thereby the cells are read out from the buffer 20.1 to the CLAD 21.1 at intervals of the initial constant time period (step S49). Thereafter, the control goes back to the step S40 (return).

Hereafter, the details of proper variation buffer value calculated by the statistical processing section 31.1 will be described with reference to FIG. 5.

First of all, it is assumed that variable X is a proper variation buffer value (msec), variable Y is a counter indicative of the number of times a notice of occurrence of variation has been received, variable Z is a current variable buffer value, variable A is a maximum permissible count value of variation occurrence, and variable B is a minimum correction value of variation buffer value. The minimum correction value of variation buffer value is defined as a minimum amount of variation to be absorbed, which is determined depending on the capacity of the variation absorbing buffer 20.1 and the ATM network 10. The variable Z is initially set to a predetermined basic variable buffer value.

Figure 5:
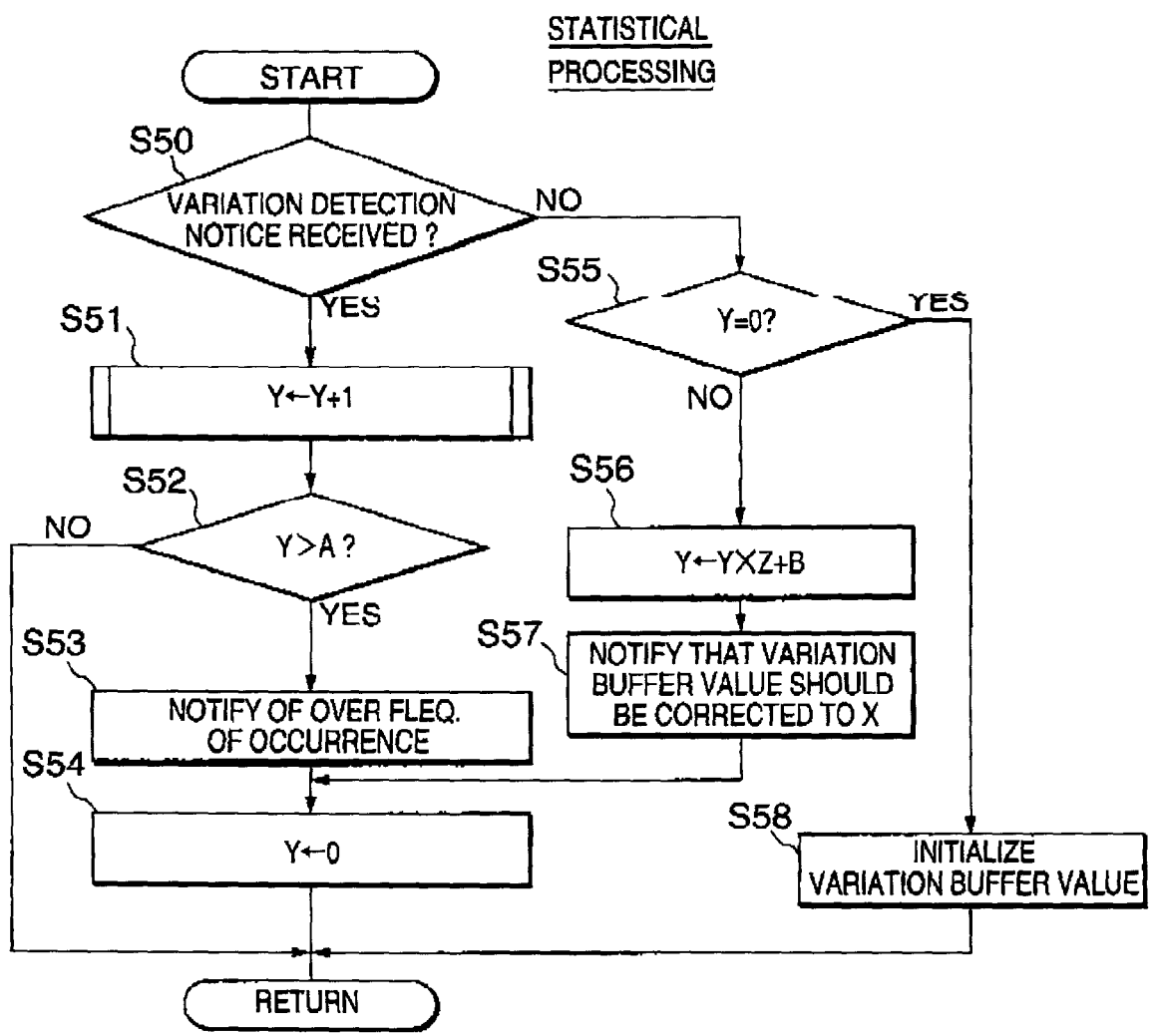
FIG. 5 is a flowchart showing an operation of statistical processing of delay variation occurrence in the embodiment.

Referring to FIG. 5, when the statistical processing starts, the counter Y and variable Z are initialized to zero and the basic variable buffer value, respectively. Then, the statistical processing section 31.1 determines whether a variation detection notice is received from the delay variation monitor 30.1 (step S50). When the variation detection notice is received (YES at step S50), the statistical processing section 31.1 increments the counter Y by one (step S51). Thereafter, it is determined whether the counter Y exceeds the variable A indicative of the maximum permissible count value of variation occurrence (step S52). When the counter Y exceeds the variable A (YES at step S52), the statistical processing section 31.1 sends a notice of over-frequency of delay variation occurrence to the messaging section 33.1 (step S53) and then the counter Y is reset to 0 (step S54). Thereafter, the control goes back to the step S50 (return). When the counter Y is equal to or smaller than the variable A (NO at step S52), the control also goes back to the step S50 (return).

On the other hand, when no variation detection notice is received (NO at step S50), the statistical processing section 31.1 determines whether the counter Y is 0 (step S55). If the counter Y is not 0 (NO at step S55), it is determined that the phenomenon of variation that has occurred stops and the statistical processing section 31.1 calculates a variable X indicative of a proper variation buffer value at that time by the following expression:

$$X = Y \times Z + B \qquad (1),$$

where Y is a counter indicative of the number of times a notice of occurrence of variation has been received, Z is a current variable buffer value, and B is a minimum correction value of to variation buffer value (step S56).

Then, the statistical processing section 31.1 instructs the buffer value correcting section 32.1 to replace the variation buffer value with the calculated proper variation buffer value X (step S57). Then the counter Y is reset to 0 (step S54) and the control goes back to the step S50 (return).

When the counter Y is 0 (YES at step S55), the current variation buffer value is set to the basic value (step S58) and the control goes back to the step S50 (return).

As described above, the variation buffer value gradually increases from the basic variation buffer value (initial value) depending on a status of occurrence of cell variation. When no variation occurrence is detected and the contiguous occurrence counter y is zero, the cells are read out from the buffer 20.1 to the CLAD 21.1 at intervals of the basic variation buffer value. In this manner, when the occurrence of cell delay variation has been detected, the current variation absorbing time width, that is, the current variation buffer value, is changed to a proper variation buffer value calculated. On the other hand, when the occurrence of cell delay variation has never been detected, the current variation buffer value is reduced to the basic variation buffer value, which can make the delaying time of ATM cells stored in the buffer 20.1 as short as possible.

Buffer Value Correction

Figure 6:
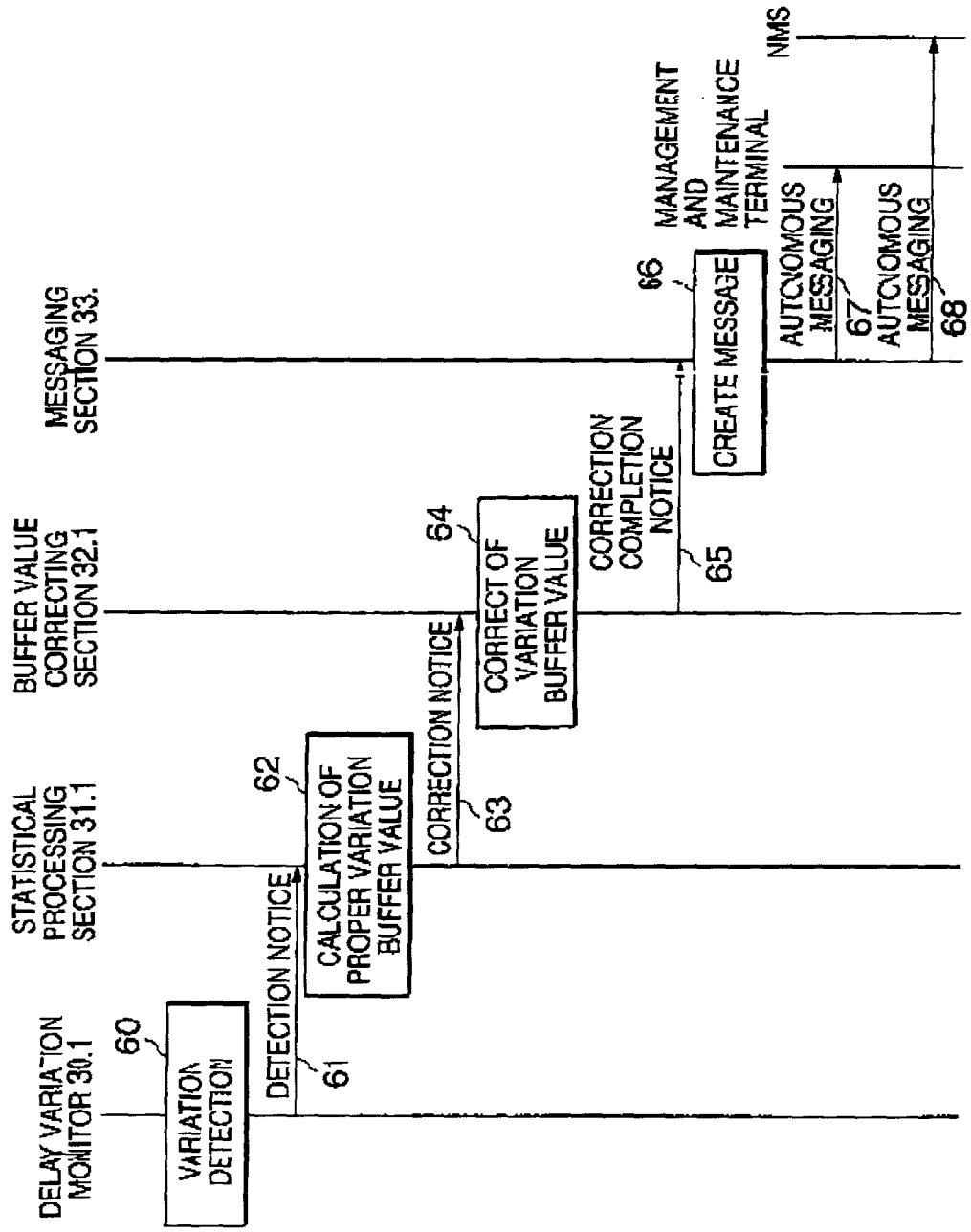
FIG. 6 is a sequence diagram showing the operation of correcting a variation buffer value in the embodiment.

Referring to FIG. 6, when the delay variation monitor 30.1 detects the occurrence of cell delay variation when no cells to be read out are found in the buffer 20.1 (variation detection 60). Then, the delay variation monitor 30.1 sends a notice of the occurrence of cell delay variation to the statistical processing section 31.1 (detection notice 61).

When receiving the notice of the occurrence of cell delay variation from the delay variation monitor 30.1, the statistical processing section 31.1 calculates a proper variation buffer value using the expression (1) when it is determined that cell delay variation that has occurred stops (calculation 62). Then, the statistical processing section 31.1 sends a variance buffer value correction notice to the buffer value correcting section 32.1 (correction notice 63).

When receiving the correction notice 63 from the statistical processing section 31.1, the buffer value correcting section 32.1 corrects a current variation buffer value using the proper variation buffer value according to the correction notice 63 (correction 64). When the correction has been completed, the buffer value correcting section 32.1 sends a correction completion notice to the messaging section 33.1 (correction completion notice 65).

When receiving the correction completion notice 65, the messaging section 33.1 creates a message having a predetermined format (creation 66) and sends the message as autonomous messages 67 and 68 to the management and maintenance terminal 15.1 and NMS 16. Here, the autonomous message includes information such that the management and maintenance terminal (15.1 and NMS 16 can recognize which flow a variation occurs in and how much amount of a corresponding buffer value is corrected by the buffer value correcting section 32.1.

Over Occurrence Frequency Limit

Referring to FIG. 7, when the delay variation monitor 30.1 detects the occurrence of cell delay variation when no cells to be read out are found in the buffer 20.1 (variation detection 70). Then, the delay variation monitor 30.1 sends a notice of the occurrence of cell delay variation to the statistical processing section 31.1 (detection notice 71).

When receiving the notice of the occurrence of cell delay variation from the delay variation monitor 30.1, the statistical processing section 31.1 increments a counter by one to count the number of contiguous occurrences of cell delay variation and then determines whether the count exceeds a predetermined count value. When it is determined that the count exceeds the predetermined count value (over variation occurrence frequency limit 72), the statistical processing section 31.1 sends a notice of over-frequency of delay variation occurrence to the messaging section 33.1 (over occurrence frequency notice 73).

When receiving the notice of over-frequency of delay variation occurrence, the messaging section 33.1 creates a message having a predetermined format (creation 74) and sends the message as autonomous messages 75 and 76 to the management and maintenance terminal 15.1 and NMS 16. Here, the autonomous message includes information such that the management and maintenance terminal 15.1 and NMS 16 can recognize which flow a variation occurs in and how many times delay variations occur contiguously.

As described above, according to the present embodiment, when the delay variation monitor 30.1 detects the occurrence of cell delay variation in a period of a set variation buffer value, the statistical processing section 31.1 counts the number of contiguous occurrences of cell delay variation. When no delay variation disappears, the statistical processing section 31.1 calculates a proper variation buffer value using the expression (1) and a current variation buffer value is updated by the proper variation buffer value. When the correction has been completed or the number of contiguous occurrences of cell delay variation exceeds the predetermined value, the messaging section 33.1 sends an autonomous message to the management and maintenance terminal 15.1 and NMS 16.

Therefore, the variation buffer value can be rapidly corrected to a proper variation buffer value reflecting the actual network operation status. Since the network management side can know on the correction of variation buffer value by receiving the autonomous message, the capability of management and maintenance can be improved without burden on the network management side.

Further, when the number of contiguous occurrences of cell delay variation exceeds the predetermined value, an autonomous message of over-frequency of delay variation occurrence is sent to the management and maintenance terminal 15.1 and NMS 16 and the butter value is not updated. Therefore, rapid maintenance work can be achieved without burden on the network management side.

The invention claimed is:

1. A controller for controlling a data buffer, comprising
a detector for detecting an empty status of the data buffer when data is read out from the data buffer at intervals of a controllable time period;
a counter for counting number of contiguous times the empty status was detected;
a calculator for calculating a proper time period depending on a value of the counter at a time when the empty status is not detected and the value of the counter is not zero; and a timing corrector for correcting the controllable time period to match the proper time period and setting the controllable time period to a predetermined value when the empty status is not detected and the value of the counter is zero.

2. The controller according to claim 1, wherein the calculator calculates the proper timing period such that the proper time period increases linearly with an increase of the value of the counter.

3. The controller according to claim 2, wherein the calculator calculates the proper time period X by an expression as follows:

$$X=Y\times Z+B,$$

where Y is a value of the counter, Z is a current controllable time period, and B is a minimum value of controllable time period.

4. The controller according to claim 1, wherein the timing corrector sets the controllable time period to the predetermined value when the empty status is not detected and the value of the counter is zero, wherein the predetermined value is an initial value which is a minimum value of the controllable time period.

5. The controller according to claim 1, further comprising:
   a determiner for determining whether a value of the counter exceeds a predetermined threshold; and
   a message creator for creating a message when the value of the counter exceeds the predetermined threshold, the message indicating that the number of contiguous times the empty status was detected exceeds the predetermined threshold.

6. The controller according to claim 5, wherein the counter is reset after correcting the controllable time period to match the proper time period or creating the message.

7. A control method for controlling a data buffer, comprising:
   a) detecting an empty status of the data buffer when data is read out from the data buffer at intervals of a controllable time period;
   b) counting number of contiguous times the empty status was detected to produce a count value;
   c) calculating a proper time period depending on a count value at a time when the empty status is not detected and the count value is not zero;
   d) correcting the controllable time period to match the proper time period; and
   e) setting the controllable time period to a predetermined value when the empty status is not detected and the count value is zero.

8. The method according to claim 7, wherein in the step (c), the proper time period is calculated such that the proper timing period increases linearly with an increase of the count value.

9. The method according to claim 8, wherein the proper timing period X is calculated by an expression as follows:

$$X=Y\times Z+B,$$

where Y is a count value, Z is a current controllable time period, and B is a minimum value of controllable time period.

10. The method according to claim 7, further comprising:
    f) when the empty status is not detected and the count value is zero, setting the controllable time period to the predetermined value, which is an initial value that is a minimum value of the controllable time period.

11. The method according to claim 7, further comprising:
    f) determining whether a count value exceeds a predetermined threshold; and
    g) creating a message when the count value exceeds the predetermined threshold, the message indicating that the number of contiguous times the empty status was detected exceeds the predetermined threshold.

12. The method according to claim 11 wherein the count value is reset after one of the step (d) of correcting the controllable time period to match the proper time period or the step (g) of creating the message.

13. A device for use in a node connecting a first network and a second network, comprising;
    a cell disassembler for converting a sequence of cells into a sequence of frames;
    a buffer for storing a cell received from the first network and sending it to the cell disassembler with a controllable time delay to absorb cell delay variation;
    a detector for detecting an empty status of the buffer when a cell is read out from the buffer at intervals of the controllable time delay;
    a counter for counting a number of contiguous times the empty status was detected; and
    a buffer controller for changing the controllable time delay depending on a value of the counter at a time when the empty status is not detected, the buffer controller comprising:
       a calculator for calculating a proper time delay depending on a value of the counter at a time when the empty status is not detected and the value of the counter is not zero, and
       a timing corrector for correcting the controllable time period to match the proper time delay and setting the controllable time delay to a predetermined value when the empty status is not detected and the value of the counter is zero.

14. The device according to claim 13, wherein the calculator calculates the proper time delay such that the proper time delay increases linearly with an increase of the value of the counter.

15. The device according to claim 14, wherein the calculator calculates the proper time delay X by an expression as follows:

$$X=Y\times Z+B,$$

where Y is a value of the counter, Z is a current controllable time delay, and B is a minimum value of controllable time delay.

16. The device according to claim 13, wherein the timing corrector sets the controllable time delay to the predetermined value when the empty status is not detected and the value of the counter is zero, wherein the predetermined value is an initial value which is a minimum value of the controllable time delay.

17. The device according to claim 13, further comprising:
    a determiner for determining whether a value of the counter exceeds a predetermined threshold; and
    a message creator for creating a message to be sent to a network management section of the first network when the value of the counter exceeds the predetermined threshold, the message indicating that the number of contiguous times the empty status was detected exceeds the predetermined threshold.

18. The device according to claim 17, wherein the counter is reset after correcting the controllable time delay to match the proper time delay or creating the message.

* * * * *